United States Patent [19]

Sundberg

[11] Patent Number: 5,773,147
[45] Date of Patent: Jun. 30, 1998

[54] CERAMIC-COATED SUPPORT FOR POWDER METAL SINTERING

[75] Inventor: Glenn J. Sundberg, Townsend, Mass.

[73] Assignee: Saint-Gobain/Norton Industrial Ceramics Corp., Worcester, Mass.

[21] Appl. No.: 484,080

[22] Filed: Jun. 7, 1995

[51] Int. Cl.$^6$ ...................................................... B32B 9/00
[52] U.S. Cl. ........................... 428/408; 428/457; 428/469; 428/472; 428/697; 428/701; 428/702; 118/726; 432/156; 432/262
[58] Field of Search .................................. 428/408, 701, 428/702, 697, 457, 469, 472; 118/726; 432/156, 262

[56] References Cited

U.S. PATENT DOCUMENTS

| | | | |
|---|---|---|---|
| 4,175,611 | 11/1979 | Fletcher | 164/418 |
| 4,219,328 | 8/1980 | Pasco et al. | 432/253 |
| 4,500,602 | 2/1985 | Patten et al. | 428/408 |
| 4,877,705 | 10/1989 | Polidor | 428/34.6 |
| 5,041,261 | 8/1991 | Buljan et al. | 419/11 |
| 5,443,892 | 8/1995 | Holcombe et al. | 428/212 |

FOREIGN PATENT DOCUMENTS

| | | |
|---|---|---|
| 20 07 638 | 3/1969 | Germany . |
| 60-106902 | 6/1985 | Japan . |
| 5-186285 | 7/1993 | Japan . |
| 5-294764 | 9/1995 | Japan . |

OTHER PUBLICATIONS

Agarwala, R.P., *Laboratory Scale Development of Coating for Improving Characteristics of Candidate Materials for Fusion Reactor*, Final Report for the Period 1 Oct. 1981—30 Nov. 1988, International Atomic Energy Agency, Jan. 1989, pp. 1–104.

Bird, E.L. et al, *Investigation of Plasma–Sprayed Laminates for High Temperature Meling Operations*, Proceedings of the International Thermal Spray Conference and Exposition, Orlando, Florida, USA, 28 May–5 Jun. 1992, pp. 625–629.

Dergunova, V.S. et al, *High–Temperature Coatings on Graphite*, Foreign Technology Divison, Wright–Patterson Air Force Base, Ohio, 27 Jun. 1974, pp. 1–11.

Ellis, T.W., et al, *Evaluation of Plasma Sprayed Crucible Coatings for Melt Processing Copper–Refractory Metal Alloys*, Proceedings of the International Thermal Spray Conference & Exposition, Orlando, Florida, USA, 28 May–5 Jun. 1992, pp., 631–636.

Koger, J.W., et al, *Coatings on Graphite Crucibles used in Melting Uranium*, Union Carbide, Oak Ridge Y–12 Plant, Oak Ridge, Tenn. 37830 (U.S.A.) received Mar. 23, 1976; accepted Jul. 20, 1976), Thin Solid Films, 39 (1976) pp. 297–303.

Konokotin, V.V., et al, *Service Properties of Metal–Oxide Plasma Coatings on Graphite*, Fizika I Khimiya Obrabotki Materialov, vol. 17, No. 1, 1983, pp. 134–136.

Molella, D.J., *Evaluation of Oxidation–Resistant Coatings in a Water–Stabilized Electric Arc at Temperature to 2325° C. (4215°)*, Technical Memorandum No. ME–1–62, pp. 1–10 and Figures 1–19.

Paithankar, A.S. et al, *Ceramic Coating by Plasma–Spray Torch*, pp. 147–147.

Ravi, V.A., et al *Coated Graphites for High Temperature Applications*, Processing & Fabrication of Advanced Materials for High Temperature Applications, II, Chicago, Illinois, Nov. 1–5, 1992, pp. 406–417.

Shershnev, A.A., et al, *A Study of Protective Plasma Coatings*, 1987 Plenum Publishing Corporation, pp. 59–62.

Sordelet, D.J., et al, *Evaluation of Plasma Arc Sprayed Refractory Metal Crucible Coatings for Containing Molten Ceramic Oxides*, Proceedings of the 1993 National Thermal Spray Conference, Anaheim, CA, 7–11 Jun. 1993, pp. 643–648.

*Primary Examiner*—Archene Turner
*Attorney, Agent, or Firm*—Thomas M. DiMauro

[57] ABSTRACT

This invention relates to an apparatus comprising:
  a) a article having a composition selected from the group consisting of graphite, carbon/carbon, carbon/graphite, and mixtures thereof, and
  b) a ceramic coating thereon, wherein the ceramic coating comprises a material selected from the group consisting of:
    i) a ceramic having an average thermal expansion coefficient of between 2 and $8 \times 10^{-6}/°$ C. between 22° C. and 1200° C. which is also phase stable in the temperature range of 22° C. and 1450° C., and
    ii) alumina having at least 99% purity.

8 Claims, No Drawings

CERAMIC-COATED SUPPORT FOR POWDER METAL SINTERING

BACKGROUND OF THE INVENTION

Because of their superior strength, wear resistance, good thermal shock resistance, high toughness, high hardness, chemical oxidation resistance and low cost, powder metallurgy components (PM) have been selected for a variety of wear applications, including metal forming tools, cutting tools, engine components and dies for compaction of abrasive particles.

Processing raw materials into a useful PM component commonly requires a number of engineering operations. One typical process entails:
  (i) preparing a powder mixture including metal or ceramic powder and metal sintering aids,
  (ii) pouring the mixture into a die and applying pressure to produce a definitively-formed compact,
  (iii) placing the compact on a ceramic-coated graphite support, and
  (iv) sintering the compact body to form a fully dense PM component.

In step iv) of the above-described process, the compact is subjected to high temperatures which facilitate material transport via mechanisms such as diffusion, viscous flow and evaporation-condensation. This transport reduces the pore size between the green body particles, and assists in strong bonding between adjacent particles, thus producing a hard, dense PM component.

Although a conventionally produced PM component works well at conventional service temperatures, there appears to be a growing need for PM components having better high temperatures properties. In particular, the automotive industry is developing engines which run at even hotter temperatures and so is seeking PM components which perform well at those temperatures.

It is known that the high temperature properties of a sintered material can often be improved simply by increasing the temperature at which it is sintered. Accordingly, initial efforts in developing a high temperature PM component focused upon sintering at about 1200°–1500° C. Although these efforts successfully produced PM components having high temperature properties, it was discovered that the ceramic coated-graphite furnace support on which the PM component was sintered displayed unacceptable degradation after only one firing. In particular, the coating had either cracked, stuck to the PM component, showed evidence of surface reaction with the PM component, exhibited poor cohesive and adhesive strength, or spalled. Because of this degradation, it was concluded the ceramic-coated graphite furnace support could not be reused. Unfortunately, replacing the coating or the coated-furnace support would be prohibitively expensive in this application.

Accordingly, there is a need for a ceramic-coated graphite furnace support which can be repeatedly used in the high temperature sintering of PM components without degradation.

SUMMARY OF THE INVENTION

In accordance with the present invention, there is provided an apparatus comprising:
  a) an article having a composition selected from the group consisting of graphite, carbon/carbon, carbon/graphite, and mixtures thereof, and
  b) a ceramic coating thereon, wherein the ceramic coating comprises a material selected from the group consisting of:
    i) a ceramic having an average thermal expansion coefficient of between 2 and $8 \times 10^{-6}$/° C. between 22° C. and 1200° C. which is also phase stable in the temperature range of 22° C. and 1450° C., and
    ii) alumina having at least 99% purity.

Also in accordance with the present invention, there is provided a process comprising the step of:
  (a) sintering a metal-containing compact (or "green body") in the above-noted apparatus at a temperature of at least about 1200° C. to form a fully dense component.

Also in accordance with the present invention, there is provided an apparatus suitable for withstanding temperatures in the range of 1000°–1800° C. (preferably between 1200° C. and 1500° C.) without substantial degradation, comprising:
  a) a base material, and
  b) a coating material, said coating material being phase stable between 22° C. and 1500° C. and having a thermal expansion coefficient between 22° C. and 1500° C. which is within a factor of four (preferably, within a factor of two) of the thermal expansion coefficient of the base material.

DETAILED DESCRIPTION OF THE INVENTION

It has been unexpectedly discovered that graphite furnace supports coated with either magnesia/alumina spinel or high purity alumina can be repeatedly used for the high temperature sintering operations without degradation. Without wishing to be tied to a particular theory, it is believed that conventional ceramic coatings such as zirconia and lower purity alumina coatings fail because they undergo phase transformation and experience thermal expansion mismatch with the graphite support. In contrast, it is believed the coatings of the present invention avoid degradation primarily because they provide an excellent thermal expansion match with CS-grade graphite at high temperatures, and secondarily because they are phase stable between 22° C. and 1450° C.

Accordingly, in preferred embodiments, the ceramic coating has an average thermal expansion coefficient of between 2 and $8 \times 10^{-6}$/° C. between 22° C. and 1200° C. and is phase stable in the temperature range of 22° C. and 1450° C., and is preferably phase stable in the temperature range of 22° C. and 1500° C. Ceramic coatings which have been discovered to meet these requirements include magnesia/alumina compositions having a magnesia/alumina molar ratio of between 3:1 and 1:3, especially magnesia/alumina spinel. It is believed magnesia/alumina spinel has an average thermal expansion coefficient of about $7.8 \times 10^{-6}$/° C. between 22° C. and 1200° C. In some embodiments, the spinel is ROKIDE MA (TM), a $MgO/Al_2O_3$ spinel available from the Saint-Gobain Industrial Ceramics Corporation of Worcester, Mass. It was found that the ROKIDE MA spinel was phase stable after a thermal cycling at 1600° C.

Ultra High Purity Alumina ("UHPA") having a purity of at least 99%, and preferably at least 99.5%, can also be selected as the coating of the present invention, even though it undergoes a one-time phase transformation to alpha alumina at about 1200° C. Because the transformation occurs only once, it is believed UHPA does not experience the repeated volume expansion and contraction which would be fatal to a ceramic used in thermal cycling applications. In some embodiments, the spinel is ROKIDE UHPA (TM), an alumina having 99.68% purity, available from the Saint-Gobain Industrial Ceramics Corporation of Worcester, Mass.

Many of the envisioned PM applications require that the PM compact be sintered between about 1200° C. and 1500° C. Accordingly, the present invention contemplates the use of any coating of the present invention in this range of sintering temperatures. However, some PM applications require the PM compact be sintered at temperatures as high as 1600° C. When these even higher temperatures are required, it has been found only the spinel coatings performs acceptably. Therefore, in accordance with the present invention, there is provided a process comprising the step of sintering a metal compact in a spinel-coated graphite furnace support at a temperature of about 1600° C. to form a fully dense metal component.

The article of the present invention has a composition selected from the group consisting of graphite, carbon/carbon, carbon/graphite, and mixtures thereof, and preferably has an average thermal expansion coefficient of between 2 and $8 \times 10^{-6}$/° C. between 22° C. and 1200° C. Preferably, the article includes a graphite having the quality of cs graphite, available from Union Carbide.

The coatings of the present invention can be applied to the furnace support in any conventional manner, including painting, curing, flame spray coating, sputtering and plasma coating. Preferably, the coatings are applied by flame spray coating. More preferably, the coatings are applied by a ROKIDE process commercialized by Saint-Gobain Industrial Ceramics Corporation of Worcester, Mass., including the process disclosed in U.S. Pat. No. 4,325,512, the specification of which is incorporated by reference.

The apparatus of the present invention can be used in any application requiring an apparatus which is inexpensive (relative to monolithic ceramics) and is chemically inert at high temperatures. In some embodiments, the apparatus is a furnace support. In other embodiments, the apparatus is an engine component, in particular a rocket nozzle.

The present invention was developed in the context of sintering either tungsten carbide or ferrous PM alloy components between about 1200° C. and 1450° C. However, it is also believed that the coatings of the present invention would work equally well in sintering other metal bearing components.

EXAMPLE I

ROKIDE MA and ROKIDE UHPA alumina coatings were applied to cs graphite furnace supports. WC compacts having a composition of 12 w/o cobalt, 1.5 w/o TaC and 86.5 w/o WC were placed on the coated furnace support. These compacts were then pressureless sintered via a cycle having a soak temperature of about 1482° C. The resulting compacts possessed essentially full density. This process was repeated with new compacts on the same support for a total of five cycles.

The ROKIDE UHPA coating displayed limited surface reaction, and appeared to be suitable for reuse. The ROKIDE MA coating appeared even more stable than the ROKIDE UHPA coating. Even though some small cracks were observed on the surface of the MA coating, it was concluded the MA coated substrate was clearly capable of further use.

EXAMPLE II

WC compacts containing 11 w/o cobalt and 89 w/o WC were sintered upon graphite furnace supports in accordance with Example I, except that the soak temperature was about 1400° C.

After five cycles, the each of the ROKIDE UHPA and MA coatings were considered to be reusable, although each displayed fine cracks.

I claim:

1. A process comprising the step of:
   (a) sintering a metal-bearing compact in an apparatus comprising:
      (i) an article having a composition selected from the group consisting of graphite, carbon/carbon, carbon/graphite, and mixtures thereof, and
      (ii) a ceramic coating thereon, wherein the ceramic coating comprises magnesia and alumina present in a molar ratio of between 3:1 and 1:3
   at a temperature of at least 1200° C. to form a fully dense component.

2. The process of claim 1 wherein the sintering temperature is between 1200° C. and 1450° C.

3. The process of claim 1 wherein the metal-bearing compact comprises tungsten carbide.

4. The process of claim 2 wherein the article has a composition consisting essentially of graphite.

5. The process of claim 1 wherein the metal-bearing compact comprises tungsten carbide.

6. The process of claim 1 wherein the sintering temperature is about 1600° C.

7. The process of claim 1 wherein the article has a composition consisting essentially of carbon/graphite.

8. The process of claim 1 wherein the article has a composition consisting essentially of carbon/carbon.

* * * * *